Patented Sept. 1, 1936

2,052,658

UNITED STATES PATENT OFFICE 2,052,658

COATING COMPOSITION

Ernest W. Reid, Pittsburgh, Pa.

No Drawing. Application December 12, 1931,
Serial No. 580,735

5 Claims. (Cl. 134—26)

This application is in part a division of my application Serial No. 278,641, filed May 17, 1928, which is now Patent 1,935,577, granted Nov. 14, 1933.

The present invention is directed to compositions which are adapted for use as protective or ornamental surface coatings or the like, and which contain vinyl resins, that is, artificial resinous products resulting from the polymerization of certain vinyl compounds.

It has been proposed to polymerize vinyl acetate (or the chlor-acetate) by heat or ultraviolet radiation, a catalyst being preferably used to promote the polymerization. Among the catalysts which have been recommended are many highly oxygenated substances, such as benzoyl peroxide; peroxides of hydrogen and metals; ozonides; persalts, such as persulphates and percarbonates; and the corresponding peracids. The product of the polymerization has been described as useful for lacquers and plastics. It has also been proposed to polymerize vinyl chloride to produce resinous products.

Notwithstanding such proposals the polymerization products of vinyl acetate have not, as far as I am aware, been used commercially for the purposes mentioned above. The reason for this appears to be that these products, when used in lacquers give a coating which, while it has good adhesive properties, is too soft, too low melting and too easily soluble in common solvents. As a result of its properties the film is readily scratched and abraded, and is easily damaged by heat or by contact with preparations containing such common solvents as alcohols.

The polymerization products of vinyl chloride have also failed to find any commercial use in liquid coating compositions or plastics. My experiments have shown that the products made from the chloride are somewhat harder, higher melting, and less soluble than those from the acetate but that they are brittle and deficient in cohesive and adhesive properties. Moreover, films prepared from them tend to darken rapidly and to become opaque, especially when exposed to sunlight. I have also polymerized vinyl benzene, or styrol ($C_6H_5.CH:CH_2$), and find that the resinous products obtained from it are somewhat similar to those from vinyl chloride, but still less adhesive.

I have attempted to overcome the objections referred to by mixing together vinyl polymers of the hard and high melting type and of the softer and more adhesive type, but without success. I have, however, discovered a quite unsuspected phenomenon, viz., that when vinyl compounds which form polymers of these types are polymerized while in mutual contact, products are obtained which differ profoundly from those which can be made by polymerizing the same compounds separately or by mixing the products obtained when the vinyl compounds are polymerized separately. The products of conjoint polymerization (by which is meant polymerization of a plurality of compounds while in mutual contact) are tough and strong and are much better adapted to the purpose of the lacquer industry with respect to insolubility (i. e. resistivity of the coatings to attack by common liquids), adhesiveness, and stability than are the polymerization products prepared from single vinyl compounds. This gives rise to the hypothesis that the conjoint polymerizations result in chemical compounds of a new type, but the validity of this hypothesis has not been proved experimentally because of the practical difficulties involved.

The methods which have been proposed for the polymerization of single vinyl compounds are in general suitable for conjoint polymerizations. Heat, ultraviolet radiation and catalysts may be advantageously used singly or jointly to expedite polymerization. A mutual solvent for the compounds involved usually facilitates the process, but in some cases a solvent may be dispensed with. When the resin produced is to be used as or in a plastic composition, any non-solidifiable solvent (by which is meant those solvents which do not react in the polymerization) present is usually removed before the final shaping of the plastic. All or part of any solvent used in the polymerization may likewise be removed from the product when the latter is to be used in a lacquer or the like, but it is often possible and desirable to use a solvent in the polymerization which is also a useful lacquer constituent and hence need not be removed completely or at all. Thus acetone may be used in the polymerization but if used it should usually be expelled, at least in part, from the product and replaced by a solvent better adapted as a lacquer ingredient. On the other hand toluene and like hydrocarbon liquids which are standard lacquer ingredients are also useful solvents for the polymerization.

The product of the conjoint polymerization of a vinyl halide with a vinyl ester of a lower aliphatic acid may be combined with a great variety of substances to produce coating compositions and other preparations. In this connection the new resins resemble known natural and artificial resins and it is only necessary to refer to the diversity of solvents, pigments, dyes, plasticizers, and other auxiliary agents which have been proposed for use in lacquers and plastics. An especially useful class of compositions are those which contain the conjoint polymerization products described herein together with cellulose derivatives, such as cellulose nitrates and acetates. Plasticizers, such as camphor, tricresyl phosphate, dibutyl phthalate, oxidized oils and the like may be incorporated as in prior compositions used in the art. Other resins either natural or artificial may of course be combined with the resins described herein.

It will be apparent from the foregoing that my invention contemplates an extraordinary number of modifications of the compositions and methods of preparation, as well as of the auxiliary agents used therein. A few specific examples will now be cited to illustrate some of the compositions and processes included in my invention.

The mixture of polymerizable substances may be dissolved in an equal weight of solvent, such as acetone or toluene, and processed in accordance with the methods of the prior art until polymerization has reached the desired stage. The solvent may then be distilled off or the entire reaction mixture may be blended with the other ingredients of the final mixture to form a lacquer-like composition in which the solvent vehicle contains the ketone or hydrocarbon originally present as well as other ingredients as desired. The polymerizable substances preferably include a vinyl halide, such as vinyl chloride, and vinyl ester of a lower aliphatic acid, such as vinyl acetate. Vinyl chloride and vinyl acetate may be used in a wide variety of proportions, for example from 10% to 90% of the acetate. Approximately equal proportions of the chloride and acetate, or slightly more than 50% of the chloride yield excellent resins for many purposes. In particular, those resins which are formed from vinyl chloride and vinyl acetate, and which contain less than about 70% of the chloride are compatible with nitrocellulose, and form excellent lacquers in combination therewith.

The percentages and parts used to designate the proportions of various substances throughout this specification and the appended claims are expressed on a gravimetric basis.

The following is an example of a lacquer enamel containing nitrocellulose and a vinyl resin prepared by the conjoint polymerization of approximately equal proportions of vinyl acetate and vinyl chloride:

| | Parts |
|---|---|
| Vinyl resin | 6 |
| Nitrocellulose | 8 |
| Titanium dioxide pigment | 10 |
| Ethylene glycol monoethyl ether | 12 |
| Ethylene glycol monoethyl ether acetate | 20 |
| Ethyl acetate | 11 |
| Toluene | 54 |
| Dibutyl phthalate | 4 |
| | 125 |

The following is the formula of a similar composition containing no nitrocellulose and in which the vinyl resin is the sole essential film-forming ingredient:

| | Parts |
|---|---|
| Vinyl resin | 15 |
| Titanium dioxide pigment | 15 |
| Ethylene glycol monoethyl ether | 2 |
| Dibutyl phthalate | 5 |
| Ethylene glycol monoethyl ether acetate | 20 |
| Acetone | 10 |
| Toluene | 50 |
| | 117 |

The following is the formula of a clear lacquer composition:

| | Parts |
|---|---|
| Vinyl resin | 7 |
| Nitrocellulose | 5 |
| Ethylene glycol monoethyl ether acetate | 12 |
| Dibutyl phthalate | 3 |
| Ethyl acetate | 15 |
| Toluene | 40 |
| | 82 |

A desirable method for preparing compositions of the type described may be as follows:

About 6.5 parts of vinyl chloride and 3.5 parts of vinyl acetate were dissolved in a solvent composed of about 50 parts toluene, 25 parts ethyl acetate and 25 parts ethylene glycol monoethyl ether acetate. About 0.1 part of benzoyl peroxide was added to this solution and the whole was maintained at 50° to 60° C. in an autoclave for a time sufficient to polymerize the vinyl compounds. The resulting solution of vinyl resin was removed from the autoclave, and to this solution was added about 10 parts of nitrocellulose and 4 parts of dibutyl phthalate. The resulting solution was a clear lacquer ready for immediate use.

It will be seen that each of the foregoing examples provides a liquid coating composition which in every case is readily flowable to produce the useful protective or ornamental surface coatings in accordance with the objects of my invention.

I claim:—

1. A coating composition containing as the sole essential film-forming ingredient, a tough and strong artificial resin resulting from the conjoint polymerization of a vinyl halide with a vinyl ester of a lower aliphatic acid, said resin being dissolved in a sufficient quantity of a volatile solvent comprising a ketone and a hydrocarbon liquid of the toluene series to make a readily flowable composition adapted to produce resistant, adhesive and stable protective or ornamental surface coatings.

2. A coating composition containing as the sole essential film-forming ingredient, a tough and strong artificial resin resulting from the conjoint polymerization of a vinyl halide with a vinyl ester of a lower aliphatic acid together with a pigment, said resin being dissolved in a sufficient quantity of a volatile solvent comprising a ketone and a hydrocarbon liquid of the toluene series to make a readily flowable composition adapted to produce resistant, adhesive and stable protective or ornamental surface coatings.

3. A coating composition containing as the sole essential film-forming ingredient, a tough and strong artificial resin resulting from the conjoint polymerization of a vinyl halide with a vinyl ester of a lower aliphatic acid, said resin being dissolved in a sufficient quantity of a volatile solvent comprising a ketone and toluene to make a readily flowable composition adapted to produce resistant, adhesive and stable protective or ornamental surface coatings.

4. A coating composition containing as the sole essential film-forming ingredient, a tough and strong artificial resin resulting from the conjoint polymerization of a vinyl chloride with vinyl acetate, said resin being dissolved in a sufficient quantity of a volatile solvent comprising a ketone and a hydrocarbon liquid of the toluene series to make a readily flowable composition adapted to produce resistant, adhesive and stable protective or ornamental surface coatings.

5. A coating composition containing as the sole essential film-forming ingredient, a tough and strong artificial resin resulting from the conjoint polymerization of a vinyl halide with a vinyl ester of a lower aliphatic acid together with a plasticizer for the resin, said resin being dissolved in a sufficient quantity of a volatile solvent to make a readily flowable composition adapted to produce resistant, adhesive and stable protective ornamental surface coatings.

ERNEST W. REID.